United States Patent [19]

Nakamura et al.

[11] Patent Number: 4,494,824

[45] Date of Patent: Jan. 22, 1985

[54] LIQUID CRYSTAL DISPLAY WITH SMALL IMPEDANCE ORIENTING FILM

[75] Inventors: Takeshi Nakamura, Yamatokoriyama; Seiji Okamoto, Osaka; Kazuyoshi Hirayama, Kashihara, all of Japan

[73] Assignee: Sharp Kabushiki Kaisha, Osaka, Japan

[21] Appl. No.: 450,775

[22] Filed: Dec. 17, 1982

[30] Foreign Application Priority Data

Dec. 18, 1981 [JP] Japan .................. 56-189671[U]

[51] Int. Cl.$^3$ .................. G02F 1/133; C09K 3/34
[52] U.S. Cl. .................. 350/334; 350/339 R; 428/1
[58] Field of Search .................. 350/334, 339 R, 340, 350/341; 428/1; 430/20

[56] References Cited

U.S. PATENT DOCUMENTS

| 4,038,441 | 7/1977 | Dubois | 350/341 X |
| 4,381,886 | 5/1983 | Yokokura | 350/340 X |

FOREIGN PATENT DOCUMENTS

| 0053317 | 4/1980 | Japan | 350/339 R |
| 0105224 | 8/1980 | Japan | 350/339 R |
| 0114926 | 9/1981 | Japan | 350/339 R |
| 0114925 | 9/1981 | Japan | 350/339 R |

*Primary Examiner*—John K. Corbin
*Assistant Examiner*—David Lewis
*Attorney, Agent, or Firm*—Birch, Stewart, Kolasch & Birch

[57] ABSTRACT

A liquid crystal display device comprises a pair of opposed substrates, a transparent electrode on at least one of the substrates, a liquid crystal composition, a characteristic orienting film comprising an organic high copolymer resin film formed at least over the surface of the electrode, and which shows an excellent orientation, and conductive particles mixed within the orienting film to reduce the resistance of the orienting film.

6 Claims, 2 Drawing Figures

LIQUID CRYSTAL DISPLAY WITH SMALL IMPEDANCE ORIENTING FILM

BACKGROUND OF THE INVENTION

1. Field of the Invention

This invention relates to a liquid crystal display device, and more particularly to liquid crystal display devices applied with specific orienting films.

2. Description of the Prior Art

Liquid crystal display devices are produced usually by preparing a pair of glass plates bearing transparent electrodes arranged in the pattern of picture elements, spacing the glass plates face-to-face at a distance of 5 μm to 100 μm to obtain a sandwich cell, placing a liquid crystal composition into the cell and sealing the cell. The optical characteristics of the liquid crystal cell are dependent largely on the orientation of the liquid crystal within the cell.

Especially with liquid crystal display devices which operate under the action of an electric field (FEM liquid crystal display devices), it is required to show a uniform liquid crystal orientation. The orientation of the liquid crystal is usually controlled by a surface treatment of the cell, or by adding a very small amount of a chemical substance to the liquid crystal.

As a mode of orientation, the liquid crystal molecules are aligned with their axes parallel to the substrate plane (homogeneous alignment) by rubbing the surface of the substrate with paper or fibers, or by forming with a slant evaporation an orienting film of vacuum-evaporated $SiO_2$ on the substrate surface, while research has been conducted in recent years on the method of obtaining the desired orientation by preparing an orienting film of an organic high polymer and rubbing the film. This method appears very useful in view of the uniformity of the orientation available and the simplicity of the procedure.

It has been known that, inorganic films include $SiO_2$, $TiO_2$ and $Y_2O_5$, and organic high polymers include polyimide, polyimide-isoindoloquinazolinedione, polyimide-benzoimidazopyrrolone, polyvinyl alcohol (P V A) and polyamide to prepare orienting films for FEM liquid crystal display devices.

The orienting films prepared from such polymers followed by rubbing treatment induce a uniform orientation on liquid crystals, have high heat resistance and good insulating properties and will not readily permit erosion of the orientation even when heated to 100° to 150° C. for sealing.

However, dielectric constants of such conventional films of organic high polymers are varied dependent on a frequency of applied signals thereto. The dielectric constants become larger as the frequency becomes lower. This is because the polarization of a dielectric film made of an organic high polymer appears as electronic polarization in a high frequency range, but in a low frequency range the polarization appears as molecular polarization, orientation polarization and interfacial polarization so that the dielectric constant becomes larger.

When a liquid crystal display having an orienting film made of an organic high polymer with a large dielectric constant is driven with an AC voltage, the impedance of the orienting film is small so that a negligible voltage drop may be provided with the orienting film. However, since the liquid crystal contains inevitably ionized impurities, they are attracted toward the surface of the orienting film to form an electric double layer. The orienting film is prevented from polarizing, the voltage drop due to the orienting film can not be neglected. In particular, the conventional liquid crystal display is driven with low frequency signals of about 100 Hz so that the voltage drop becomes serious.

The ionized impurities for causing the electric double layer are ions ($Na^+$ and $K^+$) separated from the surface of a glass flask used to manufacture and compose the liquid crystal. Other ions such as $Fe^{++}$, $Na^+$, $Cu^{++}$, $H^+$, $OH^-$, $Cl$ etc. may be contained as the inonized impurities.

When an electric field is applied across the orienting films and the liquid crystal containing the ionized impurities, the ions in the liquid crystal tend to gather round the surfaces of the orienting films to thereby reduce the dielectric constants of the orienting films and form the electric double layer. Hence, the voltage drop appears outside the liquid crystal layer and an actual voltage to be applied across the liquid crystal layer is lowered. This increases the threshold voltage of the liquid crystal and decreases the display contrast.

SUMMARY OF THE INVENTION

Accordingly, it is an object of the present invention to provide an improved liquid crystal display for showing good visibility.

It is another object of the present invention to provide an improved orienting layer for a liquid crystal display, the resistance of the orienting layer being small.

It is a further object of the present invention to provide an improved orienting layer for a liquid crystal display, the orienting layer being made of an organic high polymer and the resistance of the orienting layer being small.

Briefly described, in accordance with the present invention, a liquid crystal display device comprises a pair of opposed substrates, a transparent electrode on at least one of the substrates, a liquid crystal composition, a characteristic orienting film comprising an organic high copolymer resin film formed at least over the surface of the electrode, and which shows an excellent orientation, and pin holes or conductive particles provided within the orienting film to reduce the resistance of the orienting film.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
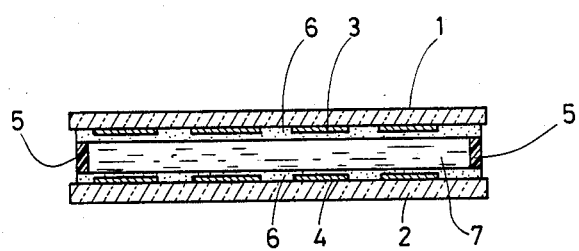
FIG. 1 shows a cross-sectional view of a TN-FEM liquid crystal display according to the present invention.

FIG. 1 shows a cross-sectional view of a TN-FEM liquid crystal display according to the present invention. The liquid crystal display device of this invention comprises a display substrate 1 bearing a transparent electrode 3, an opposed substrate 2 facing the display substrate 1 and bearing an opposed electrode 4, a liquid crystal composition 7 sandwiched between the substrates, and sealing members 5.

According to the present invention, an orienting film 6 comprising an organic high copolymer resin for example, in a thickness of about 50—about 1,000 Å is formed on at least one surface of each of the electrodes.

Organic high polymers suitable for the orienting film 6 include polyimide, polyimide-isoindoloquinazolinedione, polyimide-benzoimidazopyrrolone, polyvinyl alcohol (P V A) and polyamide etc. The orienting film 6 prepared from such polymers followed by rubbing treatment induces a uniform orientation on liquid crystal.

As a preferred example of the present invention, the polyimide-siloxane copolymer resin as the orienting film 6 of the invention is produced by copolymerizing, in an organic solvent, a diaminosiloxane having the formula (I):

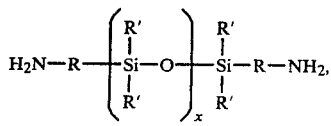
(I)

wherein R is a bivalent organic group, R' is a monovalent organic group and x is an integer from 1 to 4, with a diamine having the formula (II):

$$H_2N-Q-NH_2 \quad (II)$$

wherein Q is a bivalent organic group free from silicon atom,
and a tetra-carboxylic acid dianhydride having the formula (III)

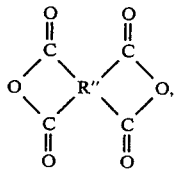
(III)

wherein R" is a tetravalent organic group, to yield a polyamido acid-siloxane copolymer resin, and heating it to occur an internal condensation.

In the above mentioned formula (I), concrete examples of the group R are alkylene groups such as methylene, ethylene, propylene, butylene, amylene, methylpropylene or hexylene group; alkenylene groups such as vinylene or propenylene group; arylene groups such as phenylene, naphthylene, phenanthrylene, anthrylene, indenylene, biphenylene, methylphenylene, dimethylphenylene, trimethylphenylene, ethylphenylene, chlorophenylene, aminophenylene or 1,2,4,5,-tetramethylphenylene group; aralkylene groups such as benzylidene, styrylidene, cinnamylidene, cuminylidene, phenylethylene, phenylpropylene, phenylbutylene or naphtylethylene group; cycloalkylene groups such as cyclopropylene, cyclobutylene, cyclopentylene, cyclohexylene, cyclopentylidene, cyclohexylidene or cycloheptylidene group; heterocyclic alkylene groups such as furfurylidene, indolylidene group; halo-alkylene group such as tetrafluoroethylene or monobromobutylen; or other groups such as —CH$_2$CH$_2$NHCH$_2$—, —CH$_2$OCH$_2$H$_2$CH$_2$—, —CH$_2$CH$_2$SCH$_2$CH$_2$— or —CH$_2$CH$_2$NHCH$_2$CH$_2$CH$_2$—. Also, concrete examples of the group R' are alkyl, alkenyl or aryl groups such as methyl, ethyl, butyl, octyl, vinyl, alkyl, phenyl, xylyl, naphthyl or tolyl group; haloalkyl, haloalkenyl or haloaryl group such as 3,3,3-trifluoropropyl, chlorophenyl, bromophenyl, γ-chlorobutyl or dichlorophenyl group; hydrolyzable organic groups such as alkoxy, aryloxy or acyloxy group (for example methoxy, isopropoxy, butoxy, phenoxy, acetoxy, propionyloxy or benzoyloxy group).

Preferred concrete examples of the diaminosiloxane (I) are;

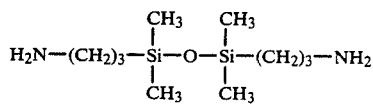

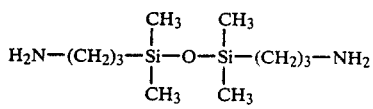

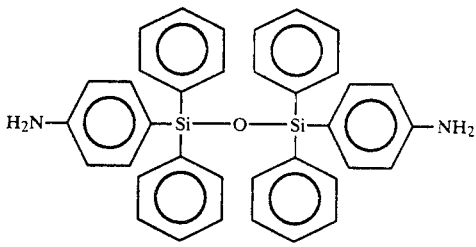

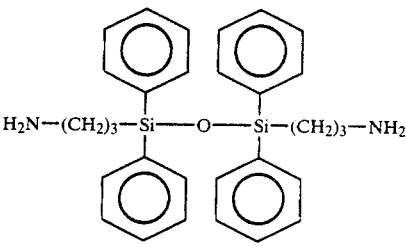

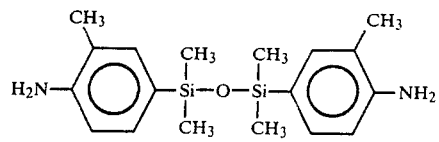

Concrete examples of the diamine (II) are m-phenylenediamine, p-phenylenediamine, 4,4'-diaminodiphenylpropane, 4,4'-diamino-diphenylmethane, benzidine, 4,4'-diamino-diphenylsufide, 4,4-diamino-diphenylsulfone, 3,3'-diamino-diphenylsulfone, 4,4'-diaminodiphenylether, 2,6-diamino-pyridine, bis (4-aminophenyl) phosphine oxide, bis(4-amino phenyl)-N-methyl amine, 1,5-diamino-naphthalene, 3,3'-dimethyl-4,4'-diamino-biphenyl, 3,3'-dimethoxybenzidine, 2,4-bis(β-amino-t-butyl) toluene, bis-(p-β-amino-t-butylphenyl)ether, p-bis(2-methyl-4-aminophenyl) benzene, p-bis-(1,1-dimethyl-5-aminopentyl) benzene, m-xylylenediamine, p-xylylenediamine, bis(p-aminocyclohexyl) methane, ethylenediamine, propylenediamine, hexamethylenediamine, heptamethylenediamine, octamethylenediamine, nonamethylenediamine, decamethylenediamine, 3-methyheptamethylenediamine, 4,4'-dimethyl-heptamethylenediamine, 2,11-diaminododecane, 1,2-bis(3-aminopropoxy)ethane, 2,2-dimethylpropylene diamine, 3-methoxy-hexamethylenediamine, 2,5- dimethyl-hexamethylenediamine, 5-methyl-nonamethylene diamine, 1,4-diaminocyclohexane, 1,12-diaminooctadecane or 2,5-diamino-1,3,4-oxadiazole.

Other examples of the group Q in the diamine (II) are ethylene, propylene, hexylene, ethyleneoxyethylene, ethyleneoxypropylene, propyleneoxypropylene, phenylene, naphtylene, biphenylene or anthrylene group or a group of the formula:

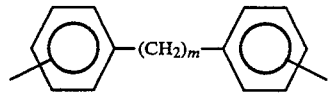

wherein m is an integer from 1 to 10.

In the formula (III), concrete examples of the group R" are those represented by the formulas:

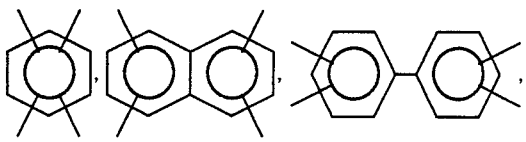

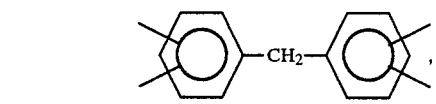

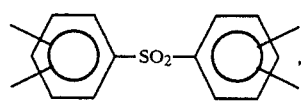

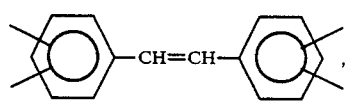

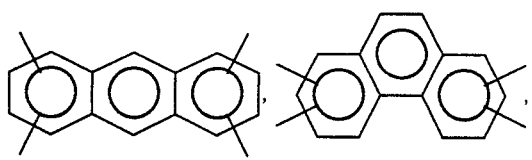

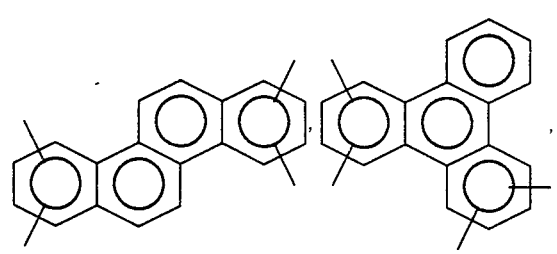

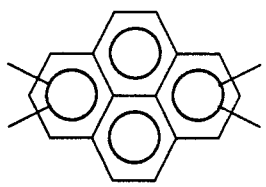

Concrete examples of the tetracarboxylic acid dianhydride (III) are pyromellitic acid dianhydride, mellitic acid dianhydride, 2,3,6,7-naphthalenetetracarboxylic acid dianhydride, 1,2,5,6-naphtalenetetracarboxylic acid dianhydride, 3,3',4,4'-diphenyltetracarboxylic acid dianhydride, 3,3',4,4'-diphenylmethanetetracarboxylic acid dianhydride, bis(3,4-dicarboxyphenyl) ether dianhydride, bis(3,4-dicarboxyphenyl) sulfone dianhydride, 3,3',4,4'-benzophenonetetracarboxylic acid dianhydride, 2,3,6,7,-anthracenetetracarboxylic acid dianhydride, 1,2,7,8-phenanthrenetetracarboxylic acid dianhydride, 2,3,6,7,-naphtalenetetracarboxylic acid dianhydride, 2,3,8,9-chrysenetetracarboxylic acid dianhydride, 2,3,6,7-triphenylenetetracarboxylic acid dianhydride, 3,4,9-perylenetetracarboxylic acid dianhydride, 1,2,7,8-coronenetetracarboxylic acid dianhydride, 1,8,4,5-naphtalenetetracarboxylic acid dianhydride or the like.

Furthermore, the compounds (I), (II) and (III) may be used in their respective admixture.

In the copolymerization of the compounds (I), (II) and (III), in an organic solvent, the molar ratio of (I) plus (II):(III) is suitable to about 1:1, in order to obtain a final product having a desirable structure of polyimide ring. In case where said molar ratio is outside the above range, the resulting orienting film will be insufficient in heat resistance, insulating properties and orientation. Also, the molar ratio of (I) and (II) to be used in the copolymerization is suitable to be 0.5:9.0–2.0:8.0, preferably 1:9. When a quantity of diaminosiloxane (I) is less, the resulting orienting film will lack sufficient abrasion resistance. On the other hand, in case where a quantity of (I) is large, the resulting orienting film will be insufficient to heat resistance.

The reaction conditions of the copolymerization and the organic solvent are suitably selected and utilized from those known in the arts.

The resulting polyamido acid-siloxane copolymer believed to be composed by the following two unit structures:

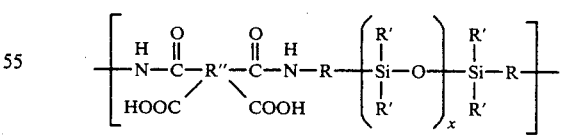

or

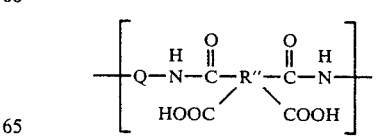

Upon heating of the polyamido acid-siloxane copolymer, it is internally condensed to form the desired polyimide-siloxane copolymer resin, which is believed to be composed by the following two unit structures:

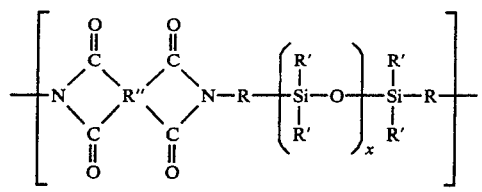

or

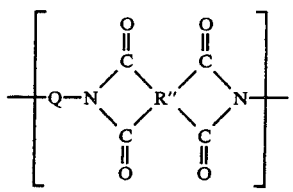

However, as explained below, the polyamido acid-siloxane copolymer in an organic solvents is conveniently and usually used for appling for the substrates, followed by heating to form the required polyimide-siloxane copolymer resin.

Usual liquid crystal compositions such as cyclohexane, biphenyl, azoxy, ester or pyrimidine type may be used as the liquid crystal compositions of the invention. These compositions may include additives such as dopants or homeotropic aligning agents.

Examples of materials used for the substrates of the liquid crystal cell of this invention are glass, ceramics, semiconductors, plastics, etc. Glass substrates are generally suitable for bearing the transparent electrode thereon.

At least one of the electrodes of the liquid crystal cell of the invention is a transparent electrode, for which ITO film (main ingredient: $In_2O_3$) measuring 300 to 500 Å in thickness and NESA film (main ingredient: $SnO_2$) are usually used.

The film 6 of polyimide-siloxane copolymer resin can be formed in the following way. For example, a solution of the aforementioned polyamide acidsiloxane copolymer resin in an organic solvent (such as N,N-dimethylacetamide, N-methyl-2-pyrrolidone or the like) is applied to the surface of substrate including an electrode, and after drying the coating is heated in an inert gas for internal condensation to form a polyimide ring. The resin solution is applicable with a spinner, roll coater or brush, or by dipping or offset printing. The film thickness is controllable as described above and as desired by varying the resin concentration of the organic solvent solution or by using a suitable method of coating. When a low-boiling organic solvent is used, it is suitable to use a spinner or the dipping method, while when a high-boiling organic solvent is used, the solution is suitably applicable by offset printing or roll coater. The dipping and offset printing methods are preferred for quantity production. The coating is dried usually at 100° to 200° C. for about 30 minutes for the removal of the solvent. The dried coating is heated in an inert gas at 250° to 400° C. for 20 minutes to 2 hours.

The copolymer resin film thus obtained is rubbed in a known manner to obtain an orienting film. This is followed by printing of seal, printing of a conductive paste, curing of the seal and injection of the liquid crystal composition in succession. The assembly is finally sealed off, whereby a liquid crystal display device is obtained according to the invention.

According to the present invention, to reduce the resistance of the orienting film 6, conductive particles made of Ag, C etc. are mixed to the orienting film 6 when a monomer is dissolved into an organic solvent to provide a solution for the organic high copolymer. The diameters of such conductor particles are in the range of about 0.1–0.2 μm. The mixing ratio of the particles are about 1 wt %.

Such solution of the monomer with the particles is coated on the surface of the substrate with the spinner or offset printing and baked as described above.

Figure 2:
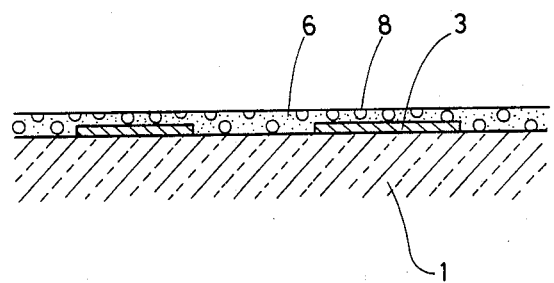
FIG. 2 shows a cross-sectional view of an orienting film made of an organic high polymer carried on a substrate according to the present invention.

FIG. 2 shows a cross-sectional view of the substrate 1 and the orienting film 6 including conductive particles 8. With the mixture of the conductive particles 8, the resistance of the orienting film 6 can be controlled in the range of about several KΩ to about several hundreds KΩ. Since the diameters of the particles 8 are very small, it is determined that no leakage between the electrodes occurs.

In place of mixing the particles 8 into the orienting film 6, pin holes may be provided within the orienting film 6 to reduce the resistance of the orienting film 6. The pin holes can be produced within the orienting film according to one of the following methods.

(1) After the coating of the high polymer resin is dried at 100° to 150° C. to remove the solvent, a fine stylus is used to make holes in the coating. Thereafter it is baked at 300° to 400° C.

(2) When the high polymer resin solution is offset printed, a printing plate with annealed holes is used to which the solution is transferred and printed.

(3) A resist ink is spotted on the substrate before the coating of the high polymer resin is coated. On the spotted resist ink, the resin is coated and dried. Thereafter, the spotted resist ink and the coating of the high polymer resin thereon are removed by applying supersound to them in a solution. This is called a lift-off method.

(4) After the coating of the high polymer resin is dried, a mask with annealed holes is disposed on the coating. The coating corresponding to the annealed holes is removed using plasma.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal display device comprising a pair of opposed substrates, a transparent electrode provided on at least one of the substrates, a liquid crystal composition sandwiched between the substrates, an orienting film of an organic high copolymer resin formed at least over the surface of the electrode which is on the substrate and is to be in contact with the liquid crystal composition, and conductive particles mixed within the orienting film to reduce the resistance of the orienting film.

2. The device of claim 1, wherein the conductive particles are made of Ag or C.

3. The device of claim 1, wherein the conductive particles are mixed within the orienting film in about 1 wt %.

4. The device of claim 1, wherein the diameters of the conductive particles are in the range of about 0.1–about 0.2 μm.

5. The device of claim 1, wherein the organic high copolymer resin is a polyimide-siloxane copolymer resin formed by copolymerizing, in an organic solvent, a diaminosiloxane having the formula (I):

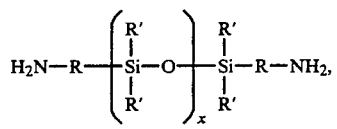

wherein R is a bivalent organic group, R' is a monovalent organic group and x is an integer from 1 to 4, with a diamine having the formula (II):

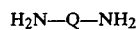

wherein Q is a bivalent organic group free from silicon atom, and a tetracarboxylic acid dianhydride having the formula (III):

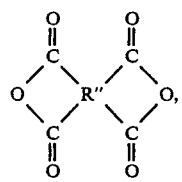

wherein R" is a tetravalent organic group, to yield a polyamido acid-siloxane copolymer resin, and subjecting it to an internal condensation under heating.

6. A liquid crystal display device comprising a pair of opposed substrates, a transparent electrode provided on at least one of the substrates, a liquid crystal composition sandwiched between the substrates, an orienting film of an organic high copolymer resin formed at least over the surface of the electrode which is on the substrate and is to be in contact with the liquid crystal composition, and holes within the orienting film to reduce the resistance of the orienting film.

* * * * *